Patented July 7, 1931

1,813,042

UNITED STATES PATENT OFFICE

ALEXANDRE FOLLIET AND NICOLAS SAINDERICHIN, OF PARIS, FRANCE

PROCESS FOR THE TREATMENT OF ZINCIFEROUS AND COMPOSITE ORES, BY THE VOLATILIZATION OF METALLIC ELEMENTS

No Drawing. Application filed May 27, 1929, Serial No. 366,522, and in France May 30, 1928.

The present invention relates to a process for enriching, oxidized ores of poor quality, zinciferous or composite ores, such for instance as calamines, by volatilizing the metallic elements without causing the scorification of the residue by reaction and fusion, in spite of a continuous operation. The elements which are volatilized and drawn forward are collected in condensing apparatus, followed by filtering apparatus, or by any other process of condensation or precipitation of the metallic dust and vapor.

The said process is based upon the action of a current of air of a penetrating nature which is heated to a constant temperature which may vary according to the case between 650° and 800° C. This hot air is blown upon a layer consisting of a mixture of ore in small pieces to which is added a suitable proportion of a gas-producing mineral fuel such as coal or lignite, and also a small percentage of an alkaline chloride.

The said process may be carried out in a revolving furnace such as the furnaces with refractory lining which are used for the distillation of mineral fuel, with renewal of the surfaces, or furnaces for the heating of cement which are suitably arranged, or in furnaces with revolving hearth which resemble certain mechanically operated furnaces for the roasting of ores.

An essential feature is the gradual heating of the mixture in such manner as not only to dry it, but also to begin the distillation, at low temperature, of the mixed fuel, which is only completed in the last region of high temperature corresponding to the combustion of the fixed carbon.

Another feature of equal importance is the uniform and constant value of the temperature of the hot air blown in.

As an example, the process is employed for the treatment of calamines containing some 15–16 per cent of zinc and 5 to 6 per cent lead, these being treated in an inclined revolving furnace with communicating chambers. To the fine ore (up to 10 mm.) is added about 30 per cent of flaming coal or lignite having 60 per cent of fixed carbon, as fine coal or lignite having 60 per cent of fixed carbon, as fine coal, and 1 to 3 per cent of crude sodium chloride. This latter addition may be replaced by sprinkling the ore in stock with sea water.

The air is raised to an effective temperature of 700 to 750° C. in multiple tube heaters of the continuous type, and is blown in at the lower axis of the furnace, entering the interior through a tangential refractory nozzle. The granular residue is continually evacuated at the lower part into a sack with double opening covers. The metal dust and vapor are discharged at the extreme top of the furnace into the chambers and apparatus adapted for condensation, filtration, or final precipitation. The loading is effected continuously at the same side, by means of a fluid-tight feeding device.

We claim:

1. The herein described process for the volatilization of zinc-bearing or composite ores which consists in adding to a mixture of ores, a combustible substance which serves solely as a reducing body and which moves forward gradually, in a thin layer, in a suitable refractory channel in which it is subjected only at the vicinity of the discharge end of said channel, to the energetic action of jets of air under pressure which is raised to a constant temperature of 650° to 800° C., whereby the residues may be discharged before their scorification commences.

2. The process, as claimed in claim 1, in which the combustible substance added to the ores consists of a gas forming mineral combustible such as flaming coal or lignite.

In testimony whereof we affix our signatures.

A. FOLLIET.
N. SAINDERICHIN.